(12) United States Patent
Comte et al.

(10) Patent No.: US 6,255,240 B1
(45) Date of Patent: Jul. 3, 2001

(54) STRENGTHENED, 1.7 INDEX, GLASS LENS

(75) Inventors: Marie J. M. Comte, Fontenay aux Roses; Alexandre M. Mayolet, Chartres, both of (FR)

(73) Assignee: Corning S.A., Avon, Cedex (FR)

( * ) Notice: Subject to any disclaimer, the term of this patent is extended or adjusted under 35 U.S.C. 154(b) by 0 days.

(21) Appl. No.: 09/316,481

(22) Filed: May 21, 1999

(30) Foreign Application Priority Data

Feb. 3, 1999 (FR) .................................................. 99 01217

(51) Int. Cl.⁷ ............................ C03C 3/068; C03C 21/00
(52) U.S. Cl. ........................ 501/78; 501/903; 65/30.14; 351/159
(58) Field of Search .................... 501/78, 903; 65/30.14; 351/159

(56) References Cited

U.S. PATENT DOCUMENTS

| | | |
|---|---|---|
| 3,997,249 | 12/1976 | Krohn et al. ........................... 351/166 |
| 4,084,978 | 4/1978 | Sagara . |
| 4,390,638 | 6/1983 | Mennemann et al. .................. 501/77 |
| 4,481,299 | * 11/1984 | Tajima .................................... 501/78 |
| 4,732,876 | 3/1988 | Nagamine et al. ..................... 501/78 |
| 4,839,314 | 6/1989 | Boudot et al. .......................... 501/78 |
| 5,277,946 | 1/1994 | Nagai et al. . |

FOREIGN PATENT DOCUMENTS 2 252 101 * 7/1992 (GB) .
2 265 367 * 9/1993 (GB) .

* cited by examiner

*Primary Examiner*—David R. Sample
(74) *Attorney, Agent, or Firm*—Milton M. Peterson

(57) ABSTRACT

The object of the present invention is a novel inorganic glass, which is capable of being strengthened by ionic exchange, and which has a refractive index of between 1.67 and 1.72; said novel glass strengthened on the surface thereof; its method of strengthening; and the corresponding ophthalmic lenses. Said novel glass has the following composition, expressed in wt. % of oxides:

| | |
|---|---|
| $SiO_2$ | 33–37 |
| $B_2O_3$ | 7.5–13 |
| with $SiO_2 + B_2O_3$ | 44–48 |
| $Li_2O$ | 5–8 |
| $Na_2O$ | >2.5–7.5 |
| $K_2O$ | 0–2 |
| with $Li_2O + Na_2O + K_2O$ | <14 |
| CaO | 0–<8 |
| $Al_2O_3$ | 0–6 |
| $Nb_2O_5$ | 8–13 |
| $ZrO_2$ | 4–6 |
| $TiO_2$ | 5–10 |
| $La_2O_3$ | 12–19 |
| SrO | 2–4 |
| $As_2O_3$ and/or $Sb_2O_3$ (refining agents). | 0–0.8 |

15 Claims, No Drawings

STRENGTHENED, 1.7 INDEX, GLASS LENS

FIELD OF THE INVENTION

The field of the present invention is an inorganic glass which has a refractive index of about 1.7, and which is advantageously strengthened by ionic exchange, as well as ophthalmic lenses of said glass.

BACKGROUND OF THE INVENTION

The present invention does in fact propose a novel glass which constitutes an improvement of the glass according to the U.S. Pat. No. 839,314 patent (Boudot et al.); it being possible for said novel glass to be tempered chemically in order to notably generate thin ophthalmic lenses (of about 1.5 mm thickness).

The various aspects of the invention—novel glass, novel strengthened glass, ophthalmic lenses—are described in detail further on in the present text.

The inorganic glass, as a constituent material of ophthalmic lenses obviously has the drawback of being much heavier than plastic. Consequently, the minimisation of the weight of ophthalmic lenses of inorganic glass has been sought for many years.

A first approach consists in reducing the density of said inorganic glass. Such a reduction is nevertheless limited by the necessity of having elements in the glass which enable obtaining the refractive index required.

Another approach, which is logical, consists in producing lenses of inorganic glass which are thinner, thinner lenses being also rendered more aesthetic. However, in order to satisfy the requirements of mechanical strength and resistance to impact of such thin lenses, it is necessary to strengthen said lenses. The strengthening by ionic exchange of such lenses has more particularly been considerably studied. During this strengthening by ionic exchange—carried out by chemical tempering—ions, usually alkaline ions, are exchanged on the surface of the glass. This enables increasing the constraint of compression on said surface and therefore the mechanical strength of the lens in said glass.

Such a method of strengthening has been carried out, with success, on conventional ophthalmic lenses which have a refractive index of 1.523 or 1.6. However, said conventional thin lenses, of said glass of relatively low index, does not enable obtaining satisfactory corrections.

The same method of strengthening has not led to satisfactory results with other inorganic glasses having a higher index (thus capable of enabling significant corrections), and especially with glasses having an index of about 1.7, as described in the U.S. Pat. No. 4,839,314 patent.

Said patent describes inorganic glasses which are particularly adapted to the production of ophthalmic lenses. These are glasses the composition of which, expressed in weight percentages based on the oxides, is given here:

| | |
|---|---|
| $SiO_2$ | 33–37 |
| $B_2O_3$ | 7.5–13 |
| with $SiO_2 + B_2O_3$ | 44–48 |
| $Nb_2O_5$ | 8–10.5 |
| $ZrO_2$ | 4–6 |
| $TiO_2$ | 5–7 |
| $La_2O_3$ | 12.3–14.5 |
| $Li_2O$ | 5–8 |
| $Na_2O$ | 0–2.5 |

-continued

| | |
|---|---|
| $K_2O$ | 0–2 |
| with $Li_2O + Na_2O + K_2O$ | 5–8 |
| CaO | 8–9.5 |
| SrO | 2–4 |
| $As_2O_3$ | 0–0.8 |

Said glasses are characterised:

- by a refractive index (n) of about 1.7 : this high index value is interesting in that it allows significant corrections under lesser thicknesses. The radius of curvature of the lens in said glasses may be increased;
- by an Abbe number ($v_d$) of at least 41: this high Abbe number value is also interesting. It indicates a low dispersion and therefore little chromatic aberration at the lens edge;
- a density of less than 3.25;
- a good acid durability.

The ophthalmic lenses produced from these glasses are therefore entirely satisfactory from the point of view of their optical properties. Their use does however remain limited insofar as, under low thicknesses, they cannot possess the mechanical properties required. As indicated above, it does in fact reveal to be impossible to strengthen the glasses in question by ionic exchange.

Thus, the ophthalmic lenses of said glass of high index must possess a minimal thickness of 2.0 mm in order to satisfy the ball-drop test in force in the United States, even though lenses of lower index which are strengthened by ionic exchange (see above) satisfy said test under thicknesses reduced to about 1.5 mm.

The Applicant, confronted with this technical problem of the conception of an inorganic glass having high index (of about 1.7), strengthable by ionic exchange (by chemical tempering), presently proposes a solution which constitutes the invention, it being entirely possible for said invention to be analysed as an improvement of the invention according to U.S. Pat. No. 4,839,314.

The Applicant presently proposes novel inorganic glasses which have compositions and properties which are around those of the glasses according to U.S. Pat. No. 839,314 but which surprisingly can be strengthened by ionic exchange (by chemical tempering).

SUMMARY OF THE INVENTION

Said novel inorganic glasses constitute the first object of the presently claimed invention. Characteristically, they possess the following composition, expressed in weight percentages based on the oxides:

| | |
|---|---|
| $SiO_2$ | 33–37 |
| $B_2O_3$ | 7.5–13 |
| with $SiO_2 + B_2O_3$ | 44–48 |
| $Li_2O$ | 5–8 |
| $Na_2O$ | >2.5–7.5 |
| $K_2O$ | 0–2 |
| with $Li_2O + Na_2O + K_2O$ | <14 |
| CaO | <8 |
| $Al_2O_3$ | 0–6 |
| $Nb_2O_5$ | 8–13 |
| $ZrO_2$ | 4–6 |
| $TiO_2$ | 5–10 |
| $La_2O_3$ | 12–19 |
| SrO | 2–4 |

-continued

| | |
|---|---|
| As$_2$O$_3$ and/or Sb$_2$O$_3$ (refining agents) | 0–0.8 |

DESCRIPTION OF THE INVENTION

The glasses of the invention, which have the above composition (composition close to that of the glasses according to U.S. 4,839,314), have kept, with respect to said glasses of the prior art, very interesting optical properties:

a refractive index of about 1.7: between 1.67 and 1.72;
an Abbe number of around 40: of at least 38;
a density of less than 3.3;
a good acid durability;

and, moreover, they are capable of being strengthened by ionic exchange. They have surprisingly revealed to be chemically temperable (while those according to U.S. Pat. No. 4,839,314 are not).

The objective sought after has been attained principally by significantly increasing the level of sodium (Na$_2$O) in the glass and in parallel by significantly limiting that of calcium (CaO). In order to compensate for the modifications of the optical properties induced by these modifications of composition, the acceptable levels of La$_2$O$_3$, Nb$_2$O$_5$ and TiO$_2$ have been increased. The result induced by these modifications—the possibility for the glass to be strengthened by ionic exchange by chemical tempering—was not predictable for the person skilled in the art who cannot ignore that the ionic exchange principally involves lithium ions. The glasses of the invention contain no more lithium than the glasses according to U.S. Pat. No. 4,839,314. A posteriori, it may be supposed, with a view to the beneficial effect of the decrease in the calcium content, that the calcium ions have a negative effect upon the mobility of the lithium ions.

It is now proposed to revert somewhat to the composition set forth above of the glasses of the invention, glasses which are particularly efficient in that they combine interesting optical properties with a facility of being able to be strengthened by ionic exchange.

Said glasses contain components which may be qualified as essential components (SiO$_2$, B$_2$O$_3$, Li$_2$O, Na$_2$O, Nb$_2$O$_5$, ZrO$_2$, TiO$_2$, La$_2$O$_3$ and optional components (K$_2$O, CaO, Al$_2$O$_3$, As$_2$O$_3$, Sb$_2$O$_3$). It is hereby specified that for all intents and purposes, as regards the optional components, the minimal amount of incorporation from which they exert a significant effect is generally of the order of 0.5%. Thus, the glasses of the invention can contain no said optional components or, if they contain them, it is generally in a minimal amount of 0.5% (% by weight).

Furthermore, the glasses of the invention do of course essentially consist of the components listed above. It will not however be excluded that they contain other constituents within them. Such other constituents—i.e. colouring or decolourising elements (for improving the yellow index) or refining agents other than those cited in the composition set forth above—are in any case only capable of being incorporated in low amounts and do not have a significant influence upon the properties sought after.

SiO$_2$ and B$_2$O$_3$ are the oxides which form the glasses of the invention. B$_2$O$_3$ facilitates the melting but its content is limited since it has a harmful effect upon the chemical durability, in particular the resistance to acids.

Al$_2$O$_3$ has a favourable effect upon the chemical tempering but an unfavourable effect upon the durability. It is tolerated in amounts by weight which are less than or equal to 6%, but it is preferred that it should not be incorporated. Thus, according to an advantageous variant, the inorganic glasses of the invention are free from Al$_2$O$_3$.

La$_2$O$_3$, Nb$_2$O$_5$ and TiO$_2$ are the elements which confer the optical properties to the glass. Their respective incorporation content is limited to the strict minimum, insofar as:

La$_2$O$_3$ is a heavy element,
Nb$_2$O$_5$ is also a relatively heavy element and moreover an expensive element,
TiO$_2$ confers a yellow coloration to the glass.

The content of at least one of these three elements must nevertheless be increased (with respect to its content in the glasses according to U.S. Pat. No. 4,839,314) in order to compensate for the decrease in the value of the refractive index which is linked to the increase in the content of Na$_2$O and to the decrease in that of CaO.

At least 4% of ZrO$_2$ is necessary in order to contribute to the value of the index and in order to improve the durability of the glass. The ZrO$_2$ content is however limited to 6% since ZrO$_2$ increases the tendency to devitrificate.

With reference to the components Li$_2$O, K$_2$O, SrO and As$_2$O$_3$ and/or Sb$_2$O$_3$ (refining agents), it is noted that the glasses of the invention contain said components or are capable of containing said components at contents which are analogous to the glasses according to U.S. Pat. No. 4,839,314.

As already specified, the modifications which are critical with respect to the composition of said glasses according to U.S. Pat. No. 4,839,314 are the increase in Na$_2$O and the decrease in CaO. The Applicant has shown that said modifications are necessary in order to obtain a significant level of ionic exchange and consequently a sufficient level of strengthening of the glass. Thus, the Na$_2$O content must be maintained at greater than 2.5 and less than or equal to 7.5%, the CaO content less than 8%. The presence of CaO is not indispensable and advantageously CaO is incorporated at a content of less than 5%.

In a particularly preferred way, the inorganic glasses of the invention do not contain any Al$_2$O$_3$ and are capable in containing CaO only at the rate of less than 5% by weight. Said preferred inorganic glasses have the following composition:

| | |
|---|---|
| SiO$_2$ | 33–37 |
| B$_2$O$_3$ | 7.5–13 |
| with SiO$_2$ + B$_2$O$_3$ | 44–48 |
| Li$_2$O | 5–8 |
| Na$_2$O | >2.5–7.5 |
| K$_2$O | 0–2 |
| with Li$_2$O + Na$_2$O + K$_2$O | <14 |
| CaO | 0–<5 |
| Nb$_2$O$_5$ | 8–13 |
| ZrO$_2$ | 4–6 |
| TiO$_2$ | 5–10 |
| La$_2$O$_3$ | 12–19 |
| SrO | 2–4 |
| As$_2$O$_3$ and/or Sb$_2$O$_3$ (refining agents) | 0–0.8 |

The manufacture of the glasses of the invention does not raise any difficulty: the manufacture does not require any unusual conditions or measures. It is within reach of the person skilled in the art. Classical starting materials, such as oxides, carbonates and nitrates can be used for preparing the fillers to be melted. The usual precautions, as to the purity of said intervening starting materials suffice for the preparation of glasses of optical quality.

It has already been set forth above that the glasses of the invention have been formulated in order to be able, advantageously, to be strengthened by ionic exchange. It is therefore conceived that the second object of the present invention consists of said glasses which are strengthened by ionic exchange, i.e. consists of inorganic glasses which possess, within their mass, the composition defined above and, on the surface thereof, a compression layer.

Advantageously, the compression layer of said glasses has a thickness of at least 60 μm and has a birefringence on the surface thereof of at least 2,500 nm/cm. The Applicant has established these specifications for glasses which are suitable as ophthalmic glasses of low thickness, ophthalmic glasses which possess a mechanical strength which is adequate for satisfying the ball-drop test set forth in the introduction to the present text.

The glasses of the invention, which are advantageously strengthened (i.e. according to the first and advantageously the second object of the present invention) are capable of constituting, as the person skilled in the art will already have understood, very efficient ophthalmic lenses. Such lenses constitute another object of the present invention.

Said lenses of the invention are advantageously of a strengthened inorganic glass, such as defined above, and can have various thicknesses. The lenses can especially have a thickness of less than 2 mm, advantageously around or equal to 1.5 mm.

Thus, it is now revealed to be possible, by virtue of the invention, to obtain thin ophthalmic lenses which have an index of around 1.7 and which have adequate mechanical properties.

It is now proposed to specify somewhat the last feature (object) of the invention, namely the method to be used for reinforcing by ionic exchange the inorganic glasses which constitute the first object of said invention. Said method is not original per se. It is a classical chemical tempering. It is original in that it is carried out with an original glass of the invention.

For the preparation of a strengthened glass of the invention, a glass of the invention is firstly prepared from adequate starting materials, and, secondly, said glass is subjected to a chemical tempering.

During said chemical tempering—in a molten salt(s) bath—ions are exchanged between said bath and the surface of the glass. At least one ion of small size of the glass is exchanged with at least one larger ion of the molten salt(s) bath maintained at a temperature which is less than (advantageously less than about 50° C.) the glass strain point (temperature at which the viscosity of the glass is $10^{13.5}$ Pa.s ($10^{14.5}$ p)). Generally, the method consists in exchanging the lithium or sodium ions of the glass with sodium or potassium ions of the bath. After cooling, the surface of the treated glass is placed under compression with respect to the core of said glass, which thus induces a strengthening of said glass, by an increase of its resistance to breakage. The layer under compression thus formed is uniform. As already indicated, the strengthening of a glass by ionic exchange, carried out by chemical tempering, is a method known per se to the person skilled in the art. It is recommended to carry it out in the context of the present invention, under the following conditions:

in a molten salt(s) bath, containing sodium ions, at a temperature of at least 400° C., for a period of time of 10 to 20 hours; and, more advantageously:

in a bath of sodium nitrate ($NaNO_3$) or of a mixture of sodium nitrate ($NaNO_3$) and of potassium nitrate ($KNO_3$) containing at least 30% by weight of sodium nitrate ($NaNO_3$), at a temperature of at least 400° C., for a period of time of 10 to 20 hours.

It is now proposed to illustrate the invention by Examples 1 to 6 below. The U.S. Pat. No. 4,839,314 technology is illustrated by Comparative Example 7.

The glasses are developed in a manner which is similar to that described in U.S. Pat. No. 839,314, from usual starting materials (oxides, carbonates, nitrates) in glass making activities. In each case, 3 kg of starting materials were melted at 1,350° C., for 2 hours, in a platinum crucible. The resulting glass was poured into the form of a bar and was annealed between about 550 and 600° C., according to its composition, with a cooling rate of 60° C. per hour.

Table 1 below gives the compositions, in weight percentages, as well as certain properties of 6 glasses of the invention (Examples 1 to 6) and of the glass of the prior art (Example 7).

The measurements of the density and the optical properties were carried out according to conventional methods, as described in U.S. Pat. No. 4,839,314. It is specified here for all intents and purposes that: Tc is the strain point, Tr, the annealing temperature, and Tl, the softening temperature.

The acid durability was determined by measuring the loss in mass of a polished sample immersed for 3 hours in a boiling aqueous solution of 20% HCl by volume.

The aptitude to the chemical tempering was determined by immersing samples of glass for 16 hours in baths at 450° C. Two baths were used: a bath having the following composition by weight: 60% $KNO_3$-40% $NaNO_3$ and the other of sodium nitrate (100% $NaNO_3$). The tempered glasses were then cut out so as to have cross sections of 200 μm thickness. The thickness of the exchanged layer and the birefringence of the surface were then determined optically on these sections. It is recalled here that the Applicant considers that the exchanged glass (having undergone ionic exchange) possesses a mechanical strength which is sufficient to be used as an ophthalmic lens if the birefringence at the surface thereof is at least 2,500 nm/cm and the thickness concerned by the exchange is at least 60 μm.

TABLE 1

| % by weight | 1 | 2 | 3 | 4 | 5 | 6 | 7 |
|---|---|---|---|---|---|---|---|
| $SiO_2$ | 34.4 | 34.4 | 34.4 | 34.4 | 34.4 | 34.4 | 34.4 |
| $B_2O_3$ | 10.45 | 10.45 | 10.45 | 10.45 | 10.45 | 10.45 | 10.45 |
| $Al_2O_3$ | 0 | 0 | 0 | 0 | 2.1 | 4.1 | 0 |
| $Li_2O$ | 6.2 | 6.2 | 6.2 | 6.2 | 6.2 | 6.2 | 6.2 |
| $Na_2O$ | 3.1 | 4.6 | 4.6 | 6.6 | 6.6 | 4.6 | 1.6 |
| $K_2O$ | 0 | 0 | 0 | 0 | 0 | 0 | 0 |
| CaO | 4.2 | 4.2 | 4.2 | 0 | 0 | 0 | 9.2 |
| SrO | 3.4 | 3.4 | 3.4 | 3.4 | 3.4 | 3.4 | 3.4 |
| BaO | 0 | 0 | 0 | 0 | 0 | 0 | 0 |
| $La_2O_3$ | 17.3 | 13.8 | 13.8 | 15.9 | 15.9 | 15.9 | 13.8 |
| $Nb_2O_5$ | 9.3 | 9.3 | 11.3 | 9.3 | 9.3 | 9.3 | 9.3 |
| $TiO_2$ | 6.45 | 8.45 | 6.45 | 8.55 | 6.45 | 6.45 | 6.45 |
| $ZrO_2$ | 4.9 | 4.9 | 4.9 | 4.9 | 4.9 | 4.9 | 4.9 |
| $As_2O_3$ | 0.3 | 0.3 | 0.3 | 0.3 | 0.3 | 0.3 | 0.3 |
| Density | 3.25 | 3.19 | 3.20 | 3.20 | 3.15 | 3.14 | 3.21 |
| Refractive index | 1.7 | 1.701 | 1.698 | 1.697 | 1.681 | 1.678 | 1.7 |
| Abbe number | 40.5 | 39.2 | 39.8 | 38.7 | 38.2 | 40.3 | 42.0 |
| Tc (° C.) | 496 | 490 | 486 | 482 | 479 | 485 | 508 |
| Tr (° C.) | 527 | 520 | 517 | 512 | 508 | 516 | 536 |
| Tl (° C.) | 630 | 621 | 619 | 611 | 609 | 623 | 637 |
| Acid durability | | | | | | | |

TABLE 1-continued

| % by weight | 1 | 2 | 3 | 4 | 5 | 6 | 7 |
|---|---|---|---|---|---|---|---|
| (DIN 12116): | | | | | | | |
| Loss in weight (mg/dm$^2$) | 1422 | | | | | | 2663 |
| Chemical tempering test | | | | | | | |
| a) NaNO$_3$ + KNO$_3$ bath | | | | | | | |
| Thickness of layer ($\mu$m) | 73 | | 84 | 141 | 136 | 136 | 26 |
| Birefringence (nm/cm) | 4061 | | 5722 | 4259 | 4259 | 4908 | |
| b) NaNO$_3$ bath | | | | | | | |
| Thickness of layer ($\mu$m) | 73 | 94 | 94 | 136 | 147 | 152 | |
| Birefringence (nm/cm) | 5300 | 4051 | 3796 | 2715 | 2855 | 4642 | |

Consideration of this Table demonstrates the interest of the glasses of the invention. With the prior art glass (Example 7), it is observed that the depth of exchange is so low that it does not lead to a strengthening.

The experimental conditions of chemical tempering specified above are in no way limiting. It is recalled here that it is generally admitted that the optimal temperature of tempering is about 50° C. less than the strain point (Tc) of the glass. Thus, temperatures of less than 450° C. may prove to be very efficient with glasses having relatively low strain points, such as the glass of Example 5 of the invention (see Table 1 above).

The Applicant has more particularly studied the conditions of chemical tempering on the glass of Example 1 (of Table 1). Tables 2 and 3 below show the results obtained with this glass, which is strengthened in baths of various compositions, at 400° C., at 400° C., for Table 2, and at 450° C., for Table 3.

TABLE 2

| Bath (400° C.) | KNO$_3$ | 60% KNO$_3$ 40% NaNO$_3$ | NaNO$_3$ |
|---|---|---|---|
| layer thickness ($\mu$m) | 0 | 21 | 42 |
| birefringence (nm/cm) | 0 | 4173 | 5350 |

TABLE 3

| Bath (450° C.) | KNO$_3$ | 60% KNO$_3$ 40% NaNO$_3$ | NaNO$_3$ |
|---|---|---|---|
| layer thickness ($\mu$m) | 31 | 73 | 73 |
| birefringence (nm/cm) | 610 | 4061 | 5301 |

Upon consideration of these figures, it is evident that the best results of tempering are obtained at 450° C. (the strain point Tc of the glass tested is 496° C.) and when the bath contains sodium ions. The superiority in terms of performance of the baths containing sodium ions is a priori explained by the significant amount of lithium ions in the glasses. The exchange of lithium with sodium is easier than that of lithium with potassium.

It is hereby specified that although the Examples given above only reflect laboratory experiments, the glasses and lenses of the invention can, without any difficulty, be manufactured industrially by classical methods (melting) in the glass industry.

What is claimed is:

1. An inorganic glass that has a refractive index of 1.67–1.72, and that is a member of a borosilicate glass family having compositions that consist essentially of, as calculated in weight percent on an oxide basis:

| | | | |
|---|---|---|---|
| SiO$_2$ | 33–37 | Li$_2$O | 5–8 |
| B$_2$O$_3$ | 7.5–13 | Na$_2$O | >2.5–7.5 |
| Al$_2$O$_3$ | 0–6 | K$_2$O | 0–2 |
| Nb$_2$O$_5$ | 8–13 | CaO | 0–<8 |
| ZrO$_2$ | 4–6 | SrO | 2–4 |
| TiO$_2$ | 5–10 | As$_2$O$_3$ | 0–0.8 |
| La$_2$O$_3$ | 12–19 | Sb$_2$O$_3$ | 0–0.8 |
| SiO$_2$ + B$_2$O$_3$ | 44–48 | Li$_2$O + Na$_2$O + K$_2$O | <14 | wherein the glass has a surface layer that is under compression and wherein the Na$_2$O content is increased and the Li$_2$O content is decreased by an ion exchange.

2. The inorganic glass in accordance with claim 1, having a composition, in weight percent on an oxide basis, within the ranges of:

| | | | |
|---|---|---|---|
| SiO$_2$ | 33–37 | Li$_2$O | 5–8 |
| B$_2$O$_3$ | 7.5–13 | Na$_2$O | 3–7 |
| SiO$_2$ + B$_2$O$_3$ | 44–48 | K$_2$O | 0–2 |
| Nb$_2$O$_5$ | 8–13 | CaO | 0–5 |
| ZrO$_2$ | 4–6 | SrO | 2–4 |
| TiO$_2$ | 5–10 | As$_2$O$_3$ | 0–0.8 |
| La$_2$O$_3$ | 12–19 | Sb$_2$O$_3$ | 0–0.8 |
| | | Li$_2$O + Na$_2$O + K$_2$O | <14. |

3. The inorganic glass in accordance with claim 1 having a composition, in weight percent on an oxide basis, consisting of: 34.4% SiO$_2$, 10.45% B$_2$O$_3$, 4.1% Al$_2$O$_3$, 6.2% Li$_2$O, 4.6% Na$_2$O, 3.4% SrO, 15.9% La$_2$O$_3$, 9.3% Nb$_2$O$_5$, 6.45% TiO$_2$, 4.9% ZrO$_2$ and 0.3% As$_2$O$_3$.

4. A inorganic glass in accordance with claim 2 having a composition, in weight percent on an oxide basis, consisting of: 34.4% SiO$_2$, 10.45% B$_2$O$_3$, 6.2% Li$_2$O, 4.6% Na$_2$O, 4.2% CaO, 3.4% SrO, 13.8% La$_2$O$_3$, 11.3% Nb$_2$O$_5$, 6.45% TiO$_2$, 4.9% ZrO$_2$ and 0.3% As$_2$O$_3$.

5. An inorganic glass in accordance with claim 1, having a composition that further contains Al$_2$O$_3$, the amount of Al$_2$O$_3$ contained in the composition being greater than zero up to 6% by weight.

6. An ophthalmic glass lens that has a refractive index of 1.67–1.72, an Abbe number greater than 38, a density less than 3.3 g/cm$^3$, and that is formed from a borosilicate glass having the composition consisting essentially of:

| | | | |
|---|---|---|---|
| SiO$_2$ | 33–37 | Li$_2$O | 5–8 |
| B$_2$O$_3$ | 7.5–13 | Na$_2$O | >2.5–7.5 |
| SiO$_2$ + B$_2$O$_3$ | 44–48 | Li$_2$O + Na$_2$O + K$_2$O | <14 |
| Al$_2$O$_3$ | 0–6 | K$_2$O | 0–2 |
| Nb$_2$O$_5$ | 8–13 | CaO | 0–<8 |
| ZrO$_2$ | 4–6 | SrO | 2–4 |
| TiO$_2$ | 5–10 | As$_2$O$_3$ | 0–0.8 |
| La$_2$O$_3$ | 12–19 | Sb$_2$O$_3$ | 0–0.8 | wherein the lens has a surface layer that is under compression, and wherein the Na$_2$O content is increased and the Li$_2$O content is decreased by an ion exchange.

7. An ophthalmic glass lens in accordance with claim 6 wherein the glass has a composition, in weight percent on an oxide basis, within the ranges of:

| SiO$_2$ | 33–37 | Li$_2$O | 5–8 |
|---|---|---|---|
| B$_2$O$_3$ | 7.5–13 | Na$_2$O | 3–7 |
| K$_2$O | 0–2 | Li$_2$O + Na$_2$O + K$_2$O | <14 |
| Nb$_2$O$_5$ | 8–10.5 | CaO | 0–5 |
| ZrO$_2$ | 4–6 | SrO | 2–4 |
| TiO$_2$ | 5–7 | As$_2$O$_3$ | 0–0.8 |
| La$_2$O$_3$ | 12–19 | Sb$_2$O$_3$ | 0–0.8. |

8. An ophthalmic glass lens in accordance with claim 6 wherein the surface compression layer has a thickness of at least 60 μm and a birefringence on the surface of at least 2500 nm/cm.

9. A method of producing an ophthalmic glass lens that is strengthened by ion exchange which comprises providing a glass lens having a composition that consists essentially of, as calculated in weight percent on an oxide basis:

| SiO$_2$ | 33–37 | Li$_2$O | 5–8 |
|---|---|---|---|
| B$_2$O$_3$ | 7.5–13 | Na$_2$O | >2.5–7.5 |
| Al$_2$O$_3$ | 0–6 | K$_2$O | 0–2 |
| Nb$_2$O$_5$ | 8–13 | CaO | 0–<8 |
| ZrO$_2$ | 4–6 | SrO | 2–4 |
| TiO$_2$ | 5–10 | As$_2$O$_3$ | 0–0.8 |
| La$_2$O$_3$ | 12–19 | | | and exchanging sodium ions for lithium ions within a surface layer on the lens at a temperature below the glass strain point.

10. A method in accordance with claim 9 that comprises exposing the lens to a molten salt bath that contains a sodium salt and that is maintained at a temperature of at least 400° C.

11. A method in accordance with claim 10 that comprises exposing the lens to the molten salt bath for a period of 10–20 hours.

12. A method in accordance with claim 9 that comprises exposing the lens to the molten salt bath composed essentially of sodium nitrate.

13. A method in accordance with claim 9 that comprises exposing the lens to a molten salt bath composed of a combination of sodium and potassium nitrates.

14. A method in accordance with claim 9 which comprises exchanging sodium ions for lithium ions to a depth of at least 60 μm within the surface of the lens.

15. A method in accordance with claim 9 which comprises exchanging sodium ions for lithium ions at a temperature about 50° C. below the glass strain point.

* * * * *